United States Patent
Nishida et al.

(10) Patent No.: US 7,012,718 B2
(45) Date of Patent: Mar. 14, 2006

(54) COLOR CORRECTING METHOD AND RECORDED MEDIUM ON WHICH COLOR CORRECTING PROGRAM IS RECORDED

(75) Inventors: Nobukatsu Nishida, 31-27, Nango 2-chome, Otsu-shi, Shiga 520-0865 (JP); Kazuyuki Uragami, 7-10, Higashitsukamoto-cho, Shimogamo, Sakyo-ku, Kyoto-shi, Kyoto 606-0855 (JP); Makoto Ito, 2-13-403, Tomioka 2-chome, Urayasu-shi, Chiba 279-0021 (JP); Naoto Takeda, Kyoto (JP)

(73) Assignees: Nobukatsu Nishida, Shiga (JP); Kazuyuki Uragami, Kyoto (JP); Makoto Ito, Chiba (JP); Fuso Precision Co., Ltd., Kyoto (JP); Sagawa Printing Co., Ltd., Kyoto (JP)

( * ) Notice: Subject to any disclaimer, the term of this patent is extended or adjusted under 35 U.S.C. 154(b) by 982 days.

(21) Appl. No.: 10/041,162

(22) Filed: Jan. 11, 2002

(65) Prior Publication Data

US 2002/0085236 A1    Jul. 4, 2002

(51) Int. Cl.
*H04N 1/40* (2006.01)
*G06K 15/00* (2006.01)
*G06F 15/00* (2006.01)

(52) U.S. Cl. .................... 358/3.23; 358/2.1; 358/1.9

(58) Field of Classification Search ............... 358/3.23, 358/2.1, 1.9, 518, 523, 534, 1.1, 1.16; 347/172; 382/167

See application file for complete search history.

(56) References Cited

U.S. PATENT DOCUMENTS

| 4,328,515 | A | 5/1982 | Wellendorf |
| 5,579,031 | A | 11/1996 | Liang |
| 6,204,873 | B1 * | 3/2001 | Shimazaki ................. 347/172 |
| 6,262,812 | B1 * | 7/2001 | Chan et al. ................. 358/1.9 |
| 6,320,676 | B1 * | 11/2001 | Yoshidome ................ 358/1.9 |

* cited by examiner

*Primary Examiner*—Mark Wallerson
*Assistant Examiner*—Charlotte M. Baker
(74) *Attorney, Agent, or Firm*—Hodgson Russ LLP

(57) ABSTRACT

An original reference value table containing converted values of image data on the entire color space is made based on known look-up tables of a printer and a correction printer, and a reference value table is wholly or partly corrected adequately so that the results of printing performed by the correction printer by referring to the original reference value table may be similar to the results of printing performed by the printer while the mutual non-linearity of converted values held in the reference value table is maintained, thus making a reference value table with an improved precision of color reproduction.

4 Claims, 3 Drawing Sheets

$$\begin{bmatrix} \text{Reference} & \text{Coordinate} & \text{Color data} \\ \text{value} & \text{data} & \\ F_1 & F_{1x}, \ F_{1Y}, \ F_{1z}, \ F_{1t}, & C_{F1}, \ M_{F1}, \ Y_{F1}, \ Bk_{F1} \\ F_2 & F_{2x}, \ F_{2Y}, \ F_{2z}, \ F_{2t}, & C_{F2}, \ M_{F2}, \ Y_{F2}, \ Bk_{F2} \\ \vdots & \vdots & \vdots \\ F_i & F_{iX}, \ F_{iY}, \ F_{iz}, \ F_{it}, & C_{Fi}, \ M_{Fi}, \ Y_{Fi}, \ Bk_{Fi} \\ \vdots & \vdots & \vdots \\ F_n & F_{nX}, \ F_{nY}, \ F_{nz}, \ F_{nt}, & C_{Fn}, \ M_{Fn}, \ Y_{Fn}, \ Bk_{Fn} \end{bmatrix}$$

COLOR CORRECTING METHOD AND RECORDED MEDIUM ON WHICH COLOR CORRECTING PROGRAM IS RECORDED

TECHNICAL FIELD OF THE INVENTION

The present invention relates to a color correcting method for enhancing the color reproducibility of printed matter to be produced by a printer in proof sheet produced by a correction printer in a printing process.

BACKGROUND ART

In a printing process, color correction is conducted prior to printing performed by a printer. The color correction is conducted in order to check finish of printing, for example, 1) the presence or absence of a typographical error or gap, 2) the presence or absence of dust, a flaw, a smear or the like, 3) gradation reproducibility such as brightness or darkness of printed matter, 4) the color reproducibility of the printed matter, 5) the sharpness of the printed matter, and the like.

The color correction is generally conducted on the basis of proof printing performed by a correction printer. In particular, computerization of pre-printing processing has been progressed in recent years, and therefore, there has been prevailed a digital correction printer which can produce proof sheet directly based on digital data by means of an ink jet system or a sublimation thermal ink-transfer system.

In this case, color matching processing is an important technique in which a color reproducing region of proof sheet produced by the correction printer is approximated to that of printed matter to be produced by a printer, thereby producing a visually similar result. However, in many cases, the respective color reproducing regions inherent to the printed matter and the proof sheet are different from each other, and thus, it is very difficult to accurately approximate the color reproducing regions to each other. For example, ink for use in printing performed by a printer is a pigment type; in contrast, ink for use in a correction printer with an ink jet system as a typical digital correction printer is mainly a dye type. In addition, since the ink of a dye type has a color reproducing region greater than that of the ink of a pigment type, the color reproducing region of the correction printer is intentionally narrowed, to be thus approximated to the color reproducing region of the printed matter.

There has been conventionally known a color matching method comprising the steps of: making look-up tables (LUTs) in which respective color reproducing regions of printed matter and proof sheet are measured by a spectrophotometer, and respective image signals are associated with color measurement values; comparing the respective look-up tables of the printed matter and the proof sheet with each other; compressing (Gamut Mapping) the color reproducing region of the proof sheet to the color reproducing region of the printed matter; obtaining a change value with respect to the image signal of the color reproducing region of the proof sheet; and thus, sequentially changing the image signal of the proof sheet to be implemented on the basis of the result.

However, a favorable result is not always produced due to various factors such as an error of the spectrophotometer or a difference in reflectance of each ink. In such a case, it is necessary to perform an appropriate color correction with respect to a partly improper color. In the method using the known LUTs, the change value is calculated while Gamut Mapping is sequentially performed. The change value depends upon combination of the two LUTs, thereby making it difficult to add a color correction value to a local color.

In the meantime, there has been conventionally known a method in which the change value of the proof sheet with respect to the image signal is previously calculated, and then, a reference value table is created. The image signal of the actual proof sheet is changed based on the reference value table. In this method, since the change value is determined, a correction value can be added in accordance with the designation of a local color. However, the interrelationship of the converted values determined in the reference value table has non-linear characteristics, so that the color matching accuracy of the entire change value may be reduced if the color correction is carried out without maintaining the interrelationship. Consequently, it is necessary to wholly or partly correct the reference value table while maintaining the non-linear characteristics.

Furthermore, most of the above-described operation depends upon try-and-error methods to gradually create the reference value table with an enhanced color reproducibility, and therefore, the reference value table per se created through such work is supported by enormous worker-years of effort.

Thus, a problem to be solved by the present invention is to readily achieve color reproducibility with high accuracy between printed matter and proof sheet in color correction.

Moreover, another problem to be solved by the present invention is to, once a reference value table with an enhanced color reproducibility is completed, readily create the completed reference value table based on an original reference value table.

DISCLOSURE OF THE INVENTION

In order to solve the above-described problems, according to the present invention, there is provided a color correcting method for enhancing the color reproducibility of printed matter to be produced by a printer in proof sheet produced by a correction printer, the color correcting method comprising the steps of (a) making an original reference value table containing converted values of image data on the entire fourdimensional color space based on known look-up tables of the printer and the correction printer, (b) wholly or partly correcting the reference value table adequately so that the proof sheet obtained based on said original reference value table is approximated to the printed matter while maintaining the mutual non-linearity of the converted values held in the reference value table, so as to make the reference value table with an improved precision of color reproduction, the step (b) further comprising the steps of (c) selecting a target reference value P to be altered in color data of the reference value table and specifying a color data altered value of the target reference value P, (d) specifying the percentage V of an influence range defining how far the color data altered value of the target reference value P has an influence on the color data of the reference value about the target reference value P, (e) defining a distance AB between a reference value A on the coordinate (Ax, Ay, Az, At) and a reference value B on the coordinate (Bx, By, Bz, Bt) in four-dimensional color space by the following equation;

$$AB = \max(|Ax-Bx|, |Ay-By|, |Az-Bz|, |At-Bt|) \quad (1),$$

where max (a, b, c, d) represents the maximum value among a, b, c and d, calculating distances between the target reference value P and each of reference value C, M, Y, Bk, R, C, B and W at corners of the four-dimensional color space, determining the maximum distance among the distances and calculating a distance Dmax to a reference value at a position most apart from the target reference value P, (f) determining an influence range Deff in accordance with the following equation;

$$\text{Deff} = D\max \times V \quad (2),$$

(g) assuming that Di represents a distance from the target reference value P to a reference value I and (Ci, Mi, Yi, Bki) represents color data of the reference value I, while (Cp', Mp', Yp', Bkp') represents color data altered values of color data (Cp, Mp, Yp, Bkp') of the target reference value P and determining the color data influence values of the reference value I other than the target reference value P according to the following equations;

$$Ci\text{eff} = (Cp'-Cp) \times (\text{Deff}-Di)/\text{Deff} \quad (3)$$

$$Mi\text{eff} = (Mp'-Mp) \times (\text{Deff}-Di)/\text{Deff} \quad (4)$$

$$Yi\text{eff} = (Yp'-Yp) \times (\text{Deff}-Di)/\text{Deff} \quad (5)$$

$$Bki\text{eff} = (Bkp'-Bkp) \times (\text{Deff}-Di)/\text{Deff} \quad (6),$$

(h) altering color data of the target reference value P based on the color data altered value, altering the color data of the reference value other than the target reference value P based on the color data influence value, and correcting the reference value table and (i) comparing the proof sheet obtained based on the reference value table corrected in the step (h) with the printed matter, and if the proof sheet substantially matches with the printed matter, regarding the reference value table obtained in the step (h) as a corrected reference value table, thus completing the execution of the steps, in contrast, unless the proof sheet matches with the printed matter, repeating the steps after the step (c).

According to a preferred embodiment of the present invention, the color correcting method further comprises the steps of (j) recording information on history of correction of the reference value table and (k) correcting the original reference value table based on the correction history information and making the reference value table with the improved precision of color reproduction.

Furthermore, in order to solve the above-described problems, according to the present invention, there is provided a recorded medium recording therein a color correcting program for enhancing the color reproducibility of printed matter to be produced by a printer in proof sheet produced by a correction printer by the use of a computer, said color correcting program instructing the computer to execute the processes of (a) generating an original reference value table containing converted values of image data on the entire four-dimensional color space based on known lookup tables of a printer and a correction printer and (b) wholly or partly correcting the reference value table adequately so that the proof sheet obtained by said original reference value table is approximated to the printed matter while maintaining the mutual non-linearity of the converted values held in the reference value table, so as to determine a reference value table with an improved precision of color reproduction, the process (b) further including the processes of (c) prompting to select a target reference value P to be altered in color data of the reference value table and to input the color data altered value of the target reference value P, (d) prompting to input the percentage of an influence range defining how far the color data altered value of the target reference value P has an influence on the color data of the reference value about said target reference value P, (e) defining a distance AB between a reference value A on the coordinate (Ax, Ay, Az, At) and a reference value B on the coordinate (Ex, By, Bz, Bt) in four-dimensional color space in accordance with the following equation;

$$AB = \max(|Ax-Bx|, |Ay-By|, |Az-Bz|, |At-Bt|,) \quad (1),$$

where max (a, b, c, d) represents the maximum value among a, b, c and d, calculating distances between the target reference value P and each of reference value C, M, Y, Bk, R, G, B and W at corners of the four-dimensional color space, determining the maximum distance among the distances and calculating a distance Dmax to a reference value at a position most apart from the target reference value P, (f) determining an influence range Deff in accordance with the following equation;

$$\text{Deff} = D\max \times V \quad (2),$$

(g) assuming that Di represents a distance from the target reference value P to a reference value I and (Ci, Mi, Yi, Bki) represents color data of the reference value I, while (Cp', Mp', Yp', Bkp') represents color data altered values of color data (Cp, Mp, Yp, Bkp') of the target reference value P and determining the color data influence values of the reference value I other than the target reference value P according to the following equations;

$$Ci\text{eff} = (Cp'-Cp) \times (\text{Deff}-Di)/\text{Deff} \quad (3),$$

$$Mi\text{eff} = (Mp'-Mp) \times (\text{Deff}-Di)/\text{Deff} \quad (4),$$

$$Yi\text{eff} = (Yp'-Yp) \times (\text{Deff}-Di)/\text{Deff} \quad (5),$$

$$Bki\text{eff} = (Bkp'-Bkp) \times (\text{Deff}-Di)/\text{Deff} \quad (6),$$

(h) correcting the reference value table by altering the color data of the target reference value based on the color data altered value, and altering the color data of the reference value other than the target reference value based on the color data influence value and (i) comparing the results of printing performed by the correction printer based on the reference value table corrected in the process (h) with the results of printing performed by the printer, and when the results of printing performed by the correction printer substantially matches with the results of printing performed by the printer, recognizing the reference value table obtained in the process (h) as a corrected reference value table, thereby completing the execution of the processes, in contrast, when the results of printing performed by the correction printer does not match with the results of printing performed by the printer, thereby repeating the processes after the process (c)

According to a preferred embodiment of the present invention, the color correcting program further instructs the computer to execute the processes of (j) recording information on history of correction of said reference value table and (k) correcting the original reference value table based on the correction history information so as to determine the reference value table with the improved precision of color reproduction.

According to a preferred embodiment of the present invention, the color correcting program further instructs the computer to execute the processes of (j) recording information on history of correction of said reference value table and (k) correcting the original reference value table based on the correction history information so as to determine the reference value table with the improved precision of color reproduction.

BEST MODE CARRYING OUT THE INVENTION

A preferred embodiment of the present invention will be described hereinafter with reference to the accompanying drawings.

Figure 1:
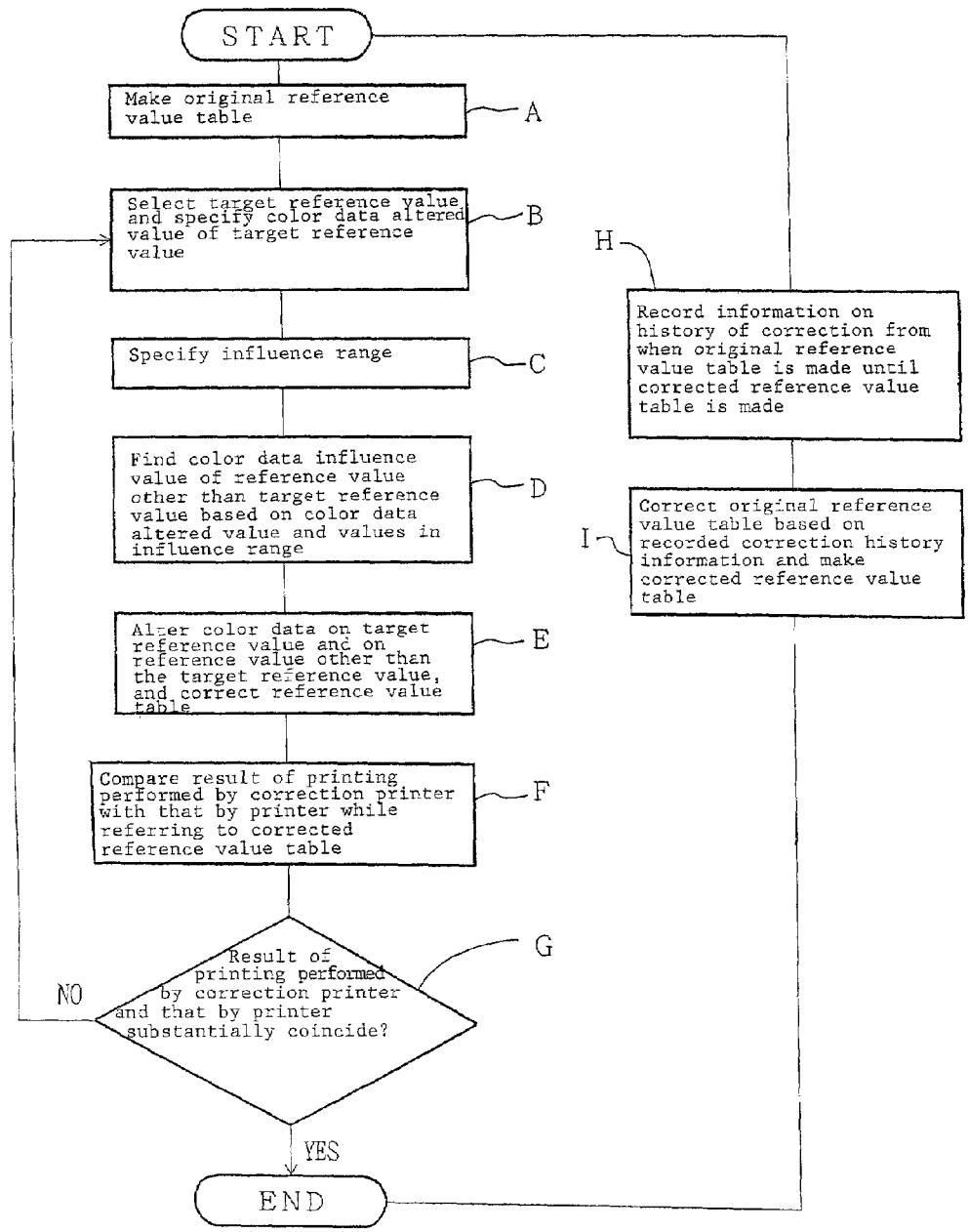
FIG. 1 is a flowchart illustrating the schematic configuration of a color correcting method according to a preferred embodiment of the present invention.

FIG. 1 is a flowchart illustrating the schematic configuration of a color correcting method according to a preferred embodiment of the present invention. As illustrated in FIG. 1, first, an original reference value table containing converted values of image data on the entire color space is made based on known look-up tables (LUTs) of a printer and a correction printer according to the color correcting method of the present invention (see Step A in FIG. 1).

In the present embodiment, the color space is formed of a four-dimensional color space in which black Bk is added to a color space in a subtractive process CMY. The color correcting method according to the present invention can be applied to a color space in an additive process RGB besides the color space in the subtractive process CMY.

Figures 2, 3:
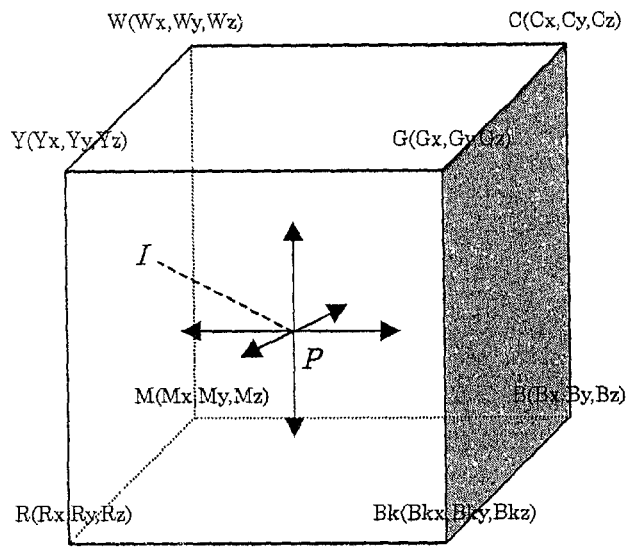
FIG. 2 is a diagram illustrating an influence range and a method for deriving a color data influence value in the preferred embodiment illustrated in FIG. 1.
FIG. 3 is a chart illustrating the constitution of a reference value table in the preferred embodiment illustrated in FIG. 1.

FIG. 3 illustrates the obtained original reference value table. As illustrated in FIG. 3, each of reference values Fi in the reference value table includes coordinate data $F_{ix}$, $F_{iy}$, $F_{iz}$, and $F_{it}$ and color data $C_{Fi}$, $M_{Fi}$, $Y_{Fi}$ and $Bk_{Fi}$ in the color space.

Next, a target reference value to be altered in color data of the reference value table is selected, and then, a color data altered value of the target reference value is specified (see Step B in FIG. 1).

And then, an influence range is specified. The influence range defines how far the change in color data of the target reference value has an influence on the color data of the reference value about the target reference value (see Step C in FIG. 1). The influence range will be described later.

Thereafter, a color data influence value of the reference value other than the target reference value is found based on the color data altered value of the target reference value and the value of the influence range (see Step D in FIG. 1).

Subsequently, referring to FIG. 2, explanation will be made on a method for deriving the influence range and the color data influence value. For the sake of simple explanation, the color space in the subtractive process CMY is used in place of the four-dimensional color space, as illustrated in FIG. 2.

In the color space, a distance AB between a reference value A on the coordinate (Ax, Ay, Az) and a reference value B on the coordinate (Bx, By, Bz) is defined by the following equation:

$$AB = \max(|Ax-Bx|, |Ay-By|, |Az-Bz|) \quad (1)$$

In this equation, max(a, b, c) represents the maximum value among a, b and C.

Now, assuming that the change in color data of a target reference value P has an influence on the color data of another reference value over the entire color space, that is, the influence range is the entire color space, a color data influence value of each of the reference values at this time is found.

A distance Dmax to a reference value at a position most apart from the target reference value P is calculated by using the above-mentioned distance defining equation. This calculation is implemented by calculating distances between the target reference value P and each of reference values C, M, Y, Bk, R, G, B and W at corners in the color space so as to find the maximum one among those distances.

Assuming that Di represents a distance from the target reference value P to a reference value I and (Ci, Mi, Yi) represents the color data of the reference value I, while (Cp', Mp', Yp') represents the color data altered values of color data (Cp, Mp, Yp) of the target reference value P, the color data influence values of the reference value I are expressed as follows:

$$Cieff = (Cp'-Cp) \times (Dmax-Di)/Dmax \quad (2)$$

$$Mieff = (Mp' \; Mp) \times (Dmax-Di)/Dmax \quad (3)$$

$$Yieff = (Yp'-Yp) \times (Dmax-Di)/Dmax \quad (4)$$

Namely, the color data influence value with respect to each of the reference values is proportionally distributed in accordance with the distance from the target reference value P in such a manner as to be reduced as the distance of the reference value from the target reference value P becomes greater.

Although the color data influence value is linearly changed in this case, it may be changed in a curved manner with an appropriate weight.

With respect to the influence range, although the influence range is specified over the entire color space in this case, it may be arbitrarily specified by specifying Deff which is equal to or smaller than Dmax. In the present embodiment, the influence range is specified in the percentage with respect to the value Dmax for the value Deff.

The color data of the target reference value is altered based on the color data altered value, and further, the color data of the reference value other than the target reference value is altered based on the color data influence value, thereby correcting the reference value table (see Step E in FIG. 1).

And then, the results of printing performed by the correction printer based on the reference value table obtained in Step E is compared with the results of printing performed by the printer (see Step F in FIG. 1). When the results of printing performed by the correction printer substantially matches with the results of printing performed by the printer, the reference value table obtained in Step E is recognized as a corrected reference value table, and thus, the execution of the steps is completed. In contrast, when the results of printing performed by the correction printer does not match with the results of printing performed by the printer, the steps after Step B are repeated (see Step G in FIG. 1). Here, the results of printing performed by the correction printer and the results of printing performed by the printer are compared visually or by using an optical measurement device such as a spectrophotometer.

In this manner, according to the present invention, the original reference value table containing the reference values of the image data over the entire color space is made based on the respective known look-up tables of the printer and the correction printer, and then, the reference value table is wholly or partly corrected adequately so that the results of printing performed by the correction printer obtained based on the original reference value table is approximated to the results of printing performed by the printer while maintaining the mutual non-linearity of the converted values held in the reference value table, thereby the reference value table with the improved precision of color reproduction. Consequently, in the color correction, it is possible to readily achieve the color reproducibility with the high accuracy in the color correction. Furthermore, according to the present invention, the reference value of the image data can be corrected without directly correcting the image data, thereby facilitating correcting operation.

Moreover, in the color correcting method according to the present invention, information on history of correction of the reference value table after the creation of the original reference value table till the creation of the corrected reference value table is recorded (see Step H in FIG. 1). The correction history information includes at least coordinate data and color data of the target reference values, the color data altered values of the target reference values, and setting values of the influence range.

Once the original reference value table is given, the original reference value table is corrected based on the recorded correction history information, so that the corrected reference value table can be readily obtained (see Step I in FIG. 1).

In this manner, according to the present invention, once the reference value table with the improved precision of color reproduction is completed, the completed reference value table can be readily made based on the original reference value table.

Additionally, if a program for executing the color correcting method according to the present invention by a computer is recorded in a recorded medium such as a flexible disk or a CD-ROM, the computer is used to read such a recorded medium, thereby readily carrying out the color correcting method according to the present invention.

Figure 4:
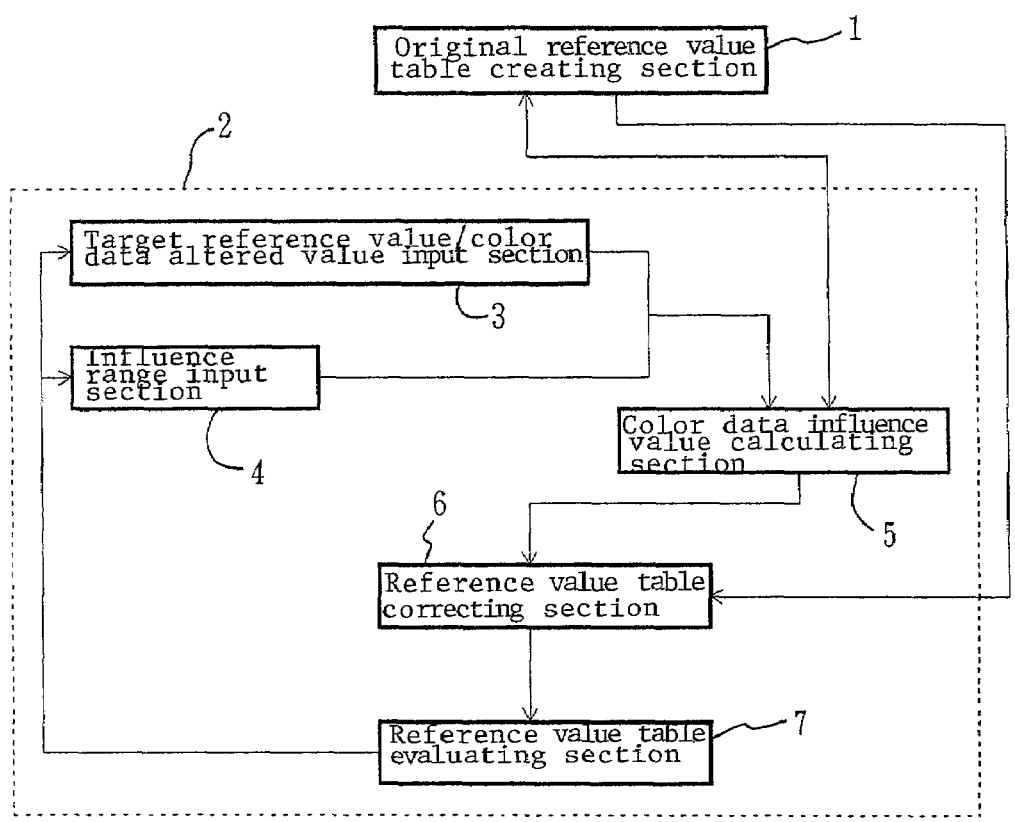
FIG. 4 is a block diagram illustrating the schematic configuration of a color correcting device in a preferred embodiment of the present invention.

FIG. 4 is a block diagram illustrating the schematic configuration of a color correcting device according to a preferred embodiment according to the present invention. The color correcting device according to the present invention is adapted to enhance the color reproducibility of printed matter in proof sheet by the use of a computer.

As illustrated in FIG. 4, the color correcting device according to the present invention comprises an original reference value table generating section 1 for generating an original reference value table containing converted values of image data on the entire color space based on known look-up tables of a printer and a correction printer, and a correction reference value calculating section 2 for wholly or partly correcting the reference value table adequately so that proof sheet obtained based on the original reference value table is approximated to printed matter while maintaining the mutual non-linearity of the converted values held in the reference value table, so as to determine a reference value table with the improved precision of color reproduction.

Furthermore, the correction reference value calculating section 2 includes a target reference value/color data altered value input section 3 for selecting a target reference value to be altered in color data of the reference value table and specifying the color data altered value of the target reference value, and an influence range input section 4 for specifying an influence range defining how far the change in color data of the target reference value has an influence on the color data of the reference value about the target reference value.

Moreover, the correction reference value calculating section 2 includes a color data influence value calculating section 5 for determining a color data influence value of the reference value other than the target reference value based on the color data altered value of the target reference value and the value of the influence range, a reference value table correcting section 6 for correcting the reference value table by altering color data on the target reference value based on the color data altered value, and altering the color data on the reference value other than the target reference value based on the color data influence value, and a reference value table evaluating section 7 for comparing the proof sheet based on the reference value table corrected by the reference value table correcting section with the printed matter, and recognizing the reference value table as a corrected reference value table if the proof sheet substantially matches with the printed matter, thereby completing the execution of the processes, in contrast, requesting a new input from the target reference value/color data altered value input section and the influence range input section unless the proof sheet matches with the printed matter.

The color correcting device according to the present invention further comprises a correction history information recording section 8 for recording information on history of correction of the reference value table. The correction reference value calculating section 2 corrects the original reference value table in accordance with the correction history information recorded in the correction history information recording section 8, thus generating the reference value table with the improved precision of color reproduction.

INDUSTRIAL UTILIZABILITY

As described above, according to the present invention, the color reproducibility with the high accuracy between the printed matter and the proof sheet can be readily achieved in the color correction. Although portability is degraded since the amount of data in the reference value table is increased in order to enhance the accuracy of the color reproducibility, the reference value table supported by enormous worker-years and experience can be reproduced only by using the correction history information once the known original look-up tables are obtained according to the present invention. Thus, the present invention can remarkably contribute to the efficiency of the correcting work.

The invention claimed is:

1. A color correcting method for enhancing the color reproducibility of printed matter to be produced by a printer in proof sheet produced by a correction printer, the color correcting method comprising the steps of:

(a) making an original reference value table containing converted values of image data on the entire four-dimensional color space based on known look-up tables of the printer and the correction printer;

(b) wholly or partly correcting the reference value table adequately so that the proof sheet obtained based on said original reference value table is approximated to the printed matter while maintaining the mutual non-linearity of the converted values held in the reference value table, so as to make the reference value table with an improved precision of color reproduction;

said step (b) further comprising the steps of:

(c) selecting a target reference value P to be altered in color data of the reference value table and specifying a color data altered value of the target reference value P;

(d) specifying a percentage V of an influence range defining how far the color data altered value of the target reference value P has an influence on the color data of the reference value about said target reference value P;

(e) defining a distance AB between a reference value A on the coordinate (Ax, Ay, Az, At) and a reference value B on the coordinate (Bx, By, Bz, Bt) in four-dimensional color space by the following equation;

$$AB=\max(|Ax-Bx|, |Ay-By|, |Az-Bz|, |At-Bt|) \quad (1),$$

where max(a, b, c, d) represents the maximum value among a, b, c and d, calculating distances between the target reference value P and each of reference value C, M, Y, Bk, R, G, B and W at corners of the four-dimensional color space, determining the maximum distance among the distances and calculating a distance Dmax to a reference value at a position most apart from the target reference value P;

(f) determining an influence range Deff in accordance with the following equation;

$$\mathit{Deff}=\mathit{Dmax} \times V \quad (2);$$

(g) assuming that Di represents a distance from the target reference value P to a reference value I and (Ci, Mi, Yi, Bki) represents color data of the reference value I, while (Cp', Mp', Yp', Bkp') represents color data altered values of color data (Cp, Mp, Yp, Bkp') of the target reference value P and determining the color data influence values of the reference value I other than the target reference value P according to the following equations;

$$\mathit{Cieff}=(Cp'-Cp)\times(\mathit{Deff}-Di)/\mathit{Deff} \quad (3)$$

$$\mathit{Mieff}=(Mp'-Mp)\times(\mathit{Deff}-Di)/\mathit{Deff} \quad (4)$$

$$\mathit{Yieff}=(Yp'-Yp)\times(\mathit{Deff}-Di)/\mathit{Deff} \quad (5)$$

$$\mathit{Bkieff}=(Bkp'-Bkp)\times(\mathit{Deff}-Di)/\mathit{Deff} \quad (6);$$

(h) altering color data of the target reference value P based on the color data altered value, altering the color data of the reference value other than the target reference value P based on the color data influence value, and correcting the reference value table; and (i) comparing the proof sheet obtained based on the reference value table corrected in the step (h) with the printed matter, and if the proof sheet substantially matches with the printed matter, regarding the reference value table obtained in the step (h) as a corrected reference value table, thus completing the execution of the steps, in contrast, unless the proof sheet matches with the printed matter, repeating the steps after the step (c).

2. The color correcting method according to claim 1, further comprising the steps of:

(j) recording information on history of correction of said reference value table; and (k) correcting said original reference value table based on said correction history information and making said reference value table with the improved precision of color reproduction.

3. A recorded medium recording therein a color correcting program for enhancing the color reproducibility of printed matter to be produced by a printer in proof sheet produced by a correction printer by the use of a computer, said color correcting program instructing the computer to execute the processes of:

(a) generating an original reference value table containing converted values of image data on the entire four-dimensional color space based on known look-up tables of a printer and a correction printer; and (b) wholly or partly correcting the reference value table adequately so that the proof sheet obtained by said original reference value table is approximated to the printed matter while maintaining the mutual non-linearity of the converted values held in the reference value table, so as to determine a reference value table with an improved precision of color reproduction, said process (b) further including the processes of:

(c) prompting to select a target reference value P to be altered in color data of the reference value table and to input the color data altered value of the target reference value P;

(d) prompting to input a percentage of an influence range defining how far the color data altered value of the target reference value P has an influence on the color data of the reference value about said target reference value P;

(e) defining a distance AB between a reference value A on the coordinate (Ax, Ay, Az, At) and a reference value B on the coordinate (Bx, By, Bz, Bt) in four-dimensional color space in accordance with the following equation;

$$AB=\max(|Ax-Bx|, |Ay-By|, |Az-Bz|, |At-Bt|) \quad (1),$$

where max(a, b, c, d) represents the maximum value among a, b, c and d, calculating distances between the target reference value P and each of reference value C, M, Y, Bk, R, G, B and W at corners of the four-dimensional color space, determining the maximum distance among the distances and calculating a distance Dmax to a reference value at a position most apart from the target reference value P;

(f) determining an influence range Deff in accordance with the following equation;

$$\mathit{Deff}=\mathit{Dmax} \times V \quad (2);$$

(g) assuming that Di represents a distance from the target reference value P to a reference value I and (Ci, Mi, Yi, Bki) represents color data of the reference value I, while (Cp', Mp', Yp', Bkp') represents color data altered values of color data (Cp, Mp, Yp, Bkp') of the target reference value P and determining the color data influence values of the reference value I other than the target reference value P according to the following equations;

$$\mathit{Cieff}=(Cp'-Cp)\times(\mathit{Deff}-Di)/\mathit{Deff} \quad (3)$$

$$\mathit{Mieff}=(Mp'-Mp)\times(\mathit{Deff}-Di)/\mathit{Deff} \quad (4)$$

$$\mathit{Yieff}=(Yp'-Yp)\times(\mathit{Deff}-Di)/\mathit{Deff} \quad (5)$$

$$\mathit{Bkieff}=(Bkp'-Bkp)\times(\mathit{Deff}-Di)/\mathit{Deff} \quad (6);$$

(h) correcting the reference value table by altering the color data of the target reference value based on the color data altered value, and altering the color data of the reference value other than the target reference value based on the color data influence value; and (i) comparing the results of printing performed by the correction printer based on the reference value table corrected in the process (h) with the results of printing performed by the printer, and when the results of printing performed by the correction printer substantially matches with the results of printing performed by the printer, recognizing the reference value table obtained in the process (h) as a corrected reference value table, thereby completing the execution of the processes, in contrast, when the results of printing performed by the correction printer does not match with the results of printing performed by the printer, thereby repeating the processes after the process (c).

4. The recorded medium recording therein the color correcting program according to claim 3, the color correcting program instructing the computer to execute the processes of:

(j) recording information on history of correction of said reference value table; and (k) correcting said original reference value table based on the correction history information so as to determine the reference value table with the improved precision of color reproduction.

\* \* \* \* \*